(12) United States Patent
Lee et al.

(10) Patent No.: US 7,796,522 B2
(45) Date of Patent: Sep. 14, 2010

(54) SYSTEM AND METHOD FOR PERFORMING TRAFFIC PROCESS IN INTEGRATED NETWORK OF VOICE-OVER INTERNET PROTOCOL NETWORK AND PUBLIC SWITCHED TELEPHONE NETWORK

(75) Inventors: Hyun Jeong Lee, Daejeon (KR); Yearn Gui Yi, Chungcheongbuk-do (KR); Byung Sun Lee, Daejeon (KR); Dae Ung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1531 days.

(21) Appl. No.: 10/912,307

(22) Filed: Aug. 4, 2004

(65) Prior Publication Data

US 2005/0135340 A1     Jun. 23, 2005

(30) Foreign Application Priority Data

Dec. 19, 2003   (KR) .................... 10-2003-0093687

(51) Int. Cl.
*H04L 12/26* (2006.01)
*G06F 15/173* (2006.01)
*G06F 15/16* (2006.01)

(52) U.S. Cl. .................. 370/237; 370/229; 709/223; 709/224; 709/226; 709/227; 709/229

(58) Field of Classification Search ......... 709/223–229; 370/229, 237

See application file for complete search history.

(56) References Cited

U.S. PATENT DOCUMENTS 6,078,959 A * 6/2000 Wright et al. ............... 709/227

7,315,512 B2 * 1/2008 Xi ............................... 370/228
7,461,147 B1 * 12/2008 Mowat et al. ............... 709/225

FOREIGN PATENT DOCUMENTS

KR       1020020026628 A     4/2002

OTHER PUBLICATIONS

Design of Duplicate System based on Commerical OS, pp. 1104-1114.

* cited by examiner

*Primary Examiner*—William C Vaughn, Jr.
*Assistant Examiner*—Carlos R Perez Toro
(74) *Attorney, Agent, or Firm*—Blakely, Sokoloff, Taylor & Zafman LLP (57) ABSTRACT

A system and method for performing a traffic process in an integrated network of a VoIP (Voice over Internet Protocol) network and a PSTN (Public Switched Telephone Network) are provided. The system includes: a softswitch which has a plurality of ASPs (Application Server Processes), transmits a data signal to other nodes through an ASP that is selected from among the ASPs, and transmits a heartbeat request message when a CPU (Central Processing Unit) utilization ratio and an SCTP (System Control Transmission Protocol) level congestion of the ASPs exceed respective reference points according to AS (Application Server)/ASP information; and a signaling gateway which updates the reference points of the CPU utilization ratio and the SCTP level congestion in response to the heartbeat request message and transmits a heartbeat acknowledgement message to the softswitch, and checks the CPU utilization ratio and the SCTP level congestion for a plurality of active ASPs within a predetermined CIC (Circuit Identification Code) or SSN (Sub-System Number) range according to the AS/ASP information, to determine the selected ASP when the signaling gateway receives data signal from outside and traffic is distributed.

17 Claims, 7 Drawing Sheets

| AS STATE | AS MODE | ASP INDEX | ASP STATE | ROUTING KEY | CPU UTILIZATION RATIO | CONGESTION |
|---|---|---|---|---|---|---|
| ACTIVE/INACTIVE /DOWN/PENDING | OVERRIDE/LOADSHARE /BROADCAST | ASP 1 | ACTIVE/INACTIVE /DOWN | DPC/OPC /CIC(OR SSN) | UTILIZATION RATIO 1 | CONGESTION 1 |
| | | ASP 2 | ACTIVE/INACTIVE /DOWN | DPC/OPC /CIC(OR SSN) | UTILIZATION RATIO 2 | CONGESTION 2 |
| ... | ... | ... | ... | ... | ... | ... |
| ACTIVE/INACTIVE /DOWN/PENDING | OVERRIDE/LOADSHARE /BROADCAST | ASP n | ACTIVE/INACTIVE /DOWN | DPC/OPC /CIC(OR SSN) | UTILIZATION RATIO n | CONGESTION n |

FIG. 5

| ASP FLAG | ASSO ID | ASP STATE | CPU UTILIZATION RATIO | CONGESTION |
|---|---|---|---|---|
| FLAG 1 | SCTP ASSOC ID | ACTIVE/INACTIVE/DOWN | UTILIZATION RATIO 1 | CONGESTION 1 |
| FLAG 2 | SCTP ASSOC ID | ACTIVE/INACTIVE/DOWN | UTILIZATION RATIO 2 | CONGESTION 2 |
| ... | ... | ... | ... | ... |
| FLAG m | SCTP ASSOC ID | ACTIVE/INACTIVE/DOWN | UTILIZATION RATIO m | CONGESTION m |

SYSTEM AND METHOD FOR PERFORMING TRAFFIC PROCESS IN INTEGRATED NETWORK OF VOICE-OVER INTERNET PROTOCOL NETWORK AND PUBLIC SWITCHED TELEPHONE NETWORK

BACKGROUND OF THE INVENTION

This application claims the priority of Korean Patent Application No. 2003-93687, filed on Dec. 19, 2003, in the Korean Intellectual Property Office, the disclosure of which is incorporated herein in its entirety by reference.

FIELD OF THE INVENTION

The present invention relates to an internet-based integrated network in which a packet network is associated with a Public Switched Telephone Network (PSTN), and more particularly, to a system and method for effectively performing a traffic process in the integrated network of a Voice over Internet Protocol (VoIP) network and a PSTN.

DESCRIPTION OF THE RELATED ART

As use of the Internet becomes increasingly widespread, a variety of systems are being vigorously studied for the effective reciprocal transmission of voice or data in an internet-based integrated network of a packet network such as Voice over Internet Protocol (VoIP) and a Switched Circuit Network (SCN) such as Public Switched Telephone Network (PSTN). In general, a Signaling System No. 7 (SS7) message is relayed through a signaling gateway and a softswitch in order to be transmitted from the SCN to the packet network. At this time, a media gateway converts the message, which is transmitted to the softswitch, into a packet format adapted to the packet network, and then transmits the message to a receiver side address through the packet network. Here, SIGTRAN (Signaling Transport) protocol is used between the signaling gateway and the softswitch, and the softswitch controls the media gateway to perform call connection routing to other nodes.

SIGTRAN protocol, used for transmitting the SS7 message from the SCN to the packet network, is constituted of a high-level layer protocol and a System Control Transmission Protocol (SCTP). The high-level layer protocol is used for supporting a service satisfying a specific SCN signal application protocol, and is exemplified by M3UA (Signaling Systems No. 7 Message Transfer Part 3 User Adaptation Layer), SUA (SS7 MTP2 User Adaptation Layer (M2UA), SS7 SCCP-User Adaptation Layer), and IUA (ISDN Q.921-User Adaptation Layer). SCTP is a new transmission protocol that exists at a layer such as Transmission Control Protocol (TCP) and User Datagram Protocol (UDP). SCTP is similar to TCP in that a connection-oriented mechanism is used and transmission of data is reliable. However, unlike TCP, SCTP provides an appropriate function in signal transmission, provides a security function against external attack such as blind Denial of Service (DoS) attacks and blind masquerade attacks, and transmits data by using a multi-stream function to accomplish more flexible data transmission than TCP even when data is lost. In addition, SCTP provides a plurality of functions such as a multi-homing function, a bundling/unbundling function, and an ordered/unordered transmission function.

Here, when a signaling gateway Process (SGP) of the signaling gateway or an Internet Protocol Server Process (IPSP) serves one Application Server (AS), it should be able to appropriately distribute the traffic of the AS to each of active Application Server Processes (ASPs) while communicating with several active ASPs, such that system performance is improved. However, the conventional signaling gateway has a drawback in that when the traffic mode is "Loadshare", effective traffic distribution cannot be accomplished since a CPU utilization ratio and SCTP level congestion of the ASP are not considered.

SUMMARY OF THE INVENTION

The present invention provides a system and method for performing a traffic process in an integrated network of a Voice over Internet Protocol (VoIP) network and a Public Switched Telephone Network (PSTN), in which AS traffic multiplexing is provided such that when the traffic mode of an ASP is "Loadshare" in the SIGTRAN of a signaling gateway, a traffic process for an SS7 message can be effectively and rapidly performed by using the CPU utilization ratio, an admissibility, and the SCTP level congestion of the ASP, and the admissibility can be enhanced by coping with ASP state change.

According to an aspect of the present invention, there is provided a system for performing a traffic process in an integrated network of a VoIP (Voice over Internet Protocol) network and a PSTN (Public Switched Telephone Network), the system comprising: a softswitch, which has a plurality of ASPs (Application Server Processes), transmits a data signal to other nodes through an ASP that is selected from among the plurality of AS PS, and transmits a heartbeat request message when a CPU (Central Processing Unit) utilization ratio and an SCTP (System Control Transmission Protocol) level congestion of the ASPs exceed respective reference points according to AS (Application Server)/ASP information; and a signaling gateway which updates the reference points of the CPU utilization ratio and the SCTP level congestion in response to the heartbeat request message and transmits a heartbeat acknowledgement message to the softswitch, and checks the CPU utilization ratio and the SCTP level congestion for a plurality of active ASPs within a predetermined CIC (Circuit Identification Code) or SSN (Sub-System Number) range according to the AS/ASP information, to determine the selected ASP when the signaling gateway receives data signal from outside and traffic is distributed.

The signaling gateway distributes the traffic to an active ASP having a lower CPU utilization ratio than a critical value among a plurality of active ASPs, when there are the plurality of active ASPs among the AS PS, and then, again distributes the traffic to an active ASP having the lowest SCTP level congestion when there are more than one active ASP having the lower CPU utilization ratio than the critical value. The signaling gateway changes an ASP that does not receive the heartbeat message to an inactive state such that the inactive ASP is not selected next time, and such that when the inactive ASP is changed back to an active state, the active ASP can be selected starting from a next data signal.

The reference point of the CPU utilization ratio is classified into a high reference point and a low reference point, the high reference point of the CPU utilization ratio is a CPU utilization ratio of an ASP having a higher CPU utilization ratio than a corresponding ASP, and the low reference point of the CPU utilization ratio is a CPU utilization ratio of an ASP having a lower CPU utilization ratio than the corresponding ASP. The reference point of the SCTP level congestion is classified into a high reference point and a low reference point, the high reference point of the SCTP level congestion is an SCTP level congestion of an ASP having a higher SCTP level congestion than a corresponding ASP, and the low reference point of the SCTP level congestion is an SCTP level congestion of an ASP having a lower SCTP level congestion than the corresponding ASP.

The signaling gateway includes an AS management process for storing the AS/ASP information. The AS information includes AS state, AS mode, ASP index, ASP state, routing key, CPU utilization ratio, and SCTP level congestion. The ASP information includes ASP flag, association IDentification (ID), ASP state, CPU utilization ratio, and SCTP level congestion. The heartbeat request message is comprised of heartbeat information TLV (Type, Length, Value), and has the CPU utilization ratio and the SCTP level congestion. The heartbeat acknowledgement message is comprised of type, chunk flags, heartbeat acknowledgement length and heartbeat information TLV, and includes low point of CPU utilization ratio, high point of CPU utilization ratio, low point of SCTP level congestion and high point of SCTP level congestion.

According to another aspect of the present invention, there is provided a method of performing a traffic process in an integrated network of a VoIP (Voice over Internet Protocol) network and a PSTN (Public Switched Telephone Network), the method including: receiving a data signal from outside; checking a CPU utilization ratio and an SCTP level congestion of a plurality of active ASPs within a predetermined CIC or SSN range according to AS/ASP information, to select one of the active ASPs; distributing traffic to the selected ASP; and transmitting the data signal to other nodes through the selected ASP.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings illustrating preferred embodiments of the present invention should be referred to in order to gain a sufficient understanding of the present invention, the merits thereof, and objectives accomplished by implementation of the present invention.

Hereinafter, the present invention will be described in detail by explaining preferred embodiments of the invention with reference to the attached drawings. In the drawings, whenever the same element reappears in subsequent drawings, it is denoted by the same reference numeral.

signaling gateway and SIGnaling TRANsport (SIGTRAN) have been extensively studied, but the present invention has several characteristics different from conventional studies.

First of all, in the present invention, when an active ASP for serving a softswitch (or application server AS) is two or more in number, a CIC (or SSN) value of a received SS7 message is compared with a registered CIC (or SSN) value of the active ASP to search for a corresponding active ASP, and when the active ASP is two or more in number within the registered CIC (or SSN) range, an ASP having a lower CPU utilization ratio than a critical value among the active ASPs is selected in an AS information storage. At this time, if the ASP having the lower CPU utilization ratio than the critical value is two or more in number, an ASP having a low SCTP level congestion is selected from among the two or more ASPs for traffic distribution. Herein, the traffic mode of the AS is "Loadshare." The signaling gateway monitors the state of the ASP by using a heartbeat message, and stores information on a change of an ASP state in the AS information storage when the ASP state is changed, to reflect the stored information and distribute traffic.

Figure 1:
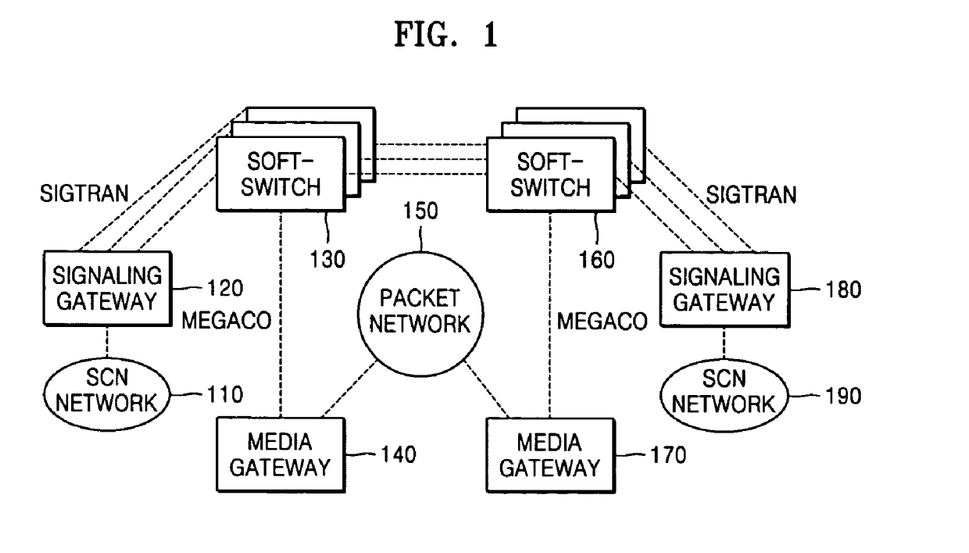
FIG. 1 is a block diagram illustrating a system for performing a traffic process in an integrated network of a packet network and a Public Switched Telephone Network (PSTN) with a signaling gateway according to a preferred embodiment of the present invention.

FIG. 1 is a block diagram illustrating a system for performing a traffic process in an integrated network of a packet network and a Public Switched Telephone Network (PSTN) with a signaling gateway according to a preferred embodiment of the present invention.

Referring to FIG. 1, the system includes a Switched Circuit Network (SCN) 110, a signaling gateway 120, a softswitch 130, and a media gateway 140 at one side node, and includes a SCN 190, the signaling gateway 180, a softswitch 160, and a media gateway 170 at the other side node. Nodes communicate through the packet network 150.

The SCNs 110 and 190 are conventional PSTNs. The signaling gateways 120 and 180 function to transmit a signal message between the SCNs 110 and 190 and the packet network 105, and include a Signaling System No. 7 (SS7) protocol stack and the SIGTRAN.

SIGTRAN protocol is used for communication between the signaling gateways 120 and 180 and the softswitches 130 and 160. The present invention uses M3UA (Signaling Systems No. 7 Message Transfer Part 3 User Adaptation Layer) protocol and SUA (SS7 SCCP-User Adaptation Layer) protocol as the high-level layer protocols of the SIGTRAN protocol. A multiplexing method can be applied to communication between the softswitches 130 and 160, but is not central to the present invention.

The softswitches 130 and 160 correspond to Application Servers (ASs). The softswitches 130 and 160 communicate an SS7 message to and from the signaling gateways 120 and 180, and control media gateways 104 and 107 to perform call connection. The softswitches 130 and 160 include SIGTRAN protocol, MEGACO (MEdia GAteway COntrol) protocol, BICC (Bearer Independent Call Control) protocol (or Session Initiation Protocol for Telephones (SIP-T) protocol), ISDN User Part (ISUP) protocol, and the like. The MEGACO protocol is used to perform communication between the softswitches 130 and 160 and the media gateways 140 and 170. The BICC protocol or the SIP-T protocol is used to set-up and release a call between both of the softswitches 130 and 160. Here, the signaling gateways 120 and 180 communicate with a plurality of ASs when there are active communication ASPs at each of a plurality of softswitches, that is, the plurality of ASs, and communicate with one AS when there is an active communication ASP at only one AS.

The media gateways 140 and 170 convert the voice media of the conventional PSTN into a packet format that is used in the packet network.

After the packet network 150 stores information transmitted from a sender side, it divides the stored information into packets of a predetermined size and adds the address of a receiver side to perform transmission in units of the packets.

Figure 2:
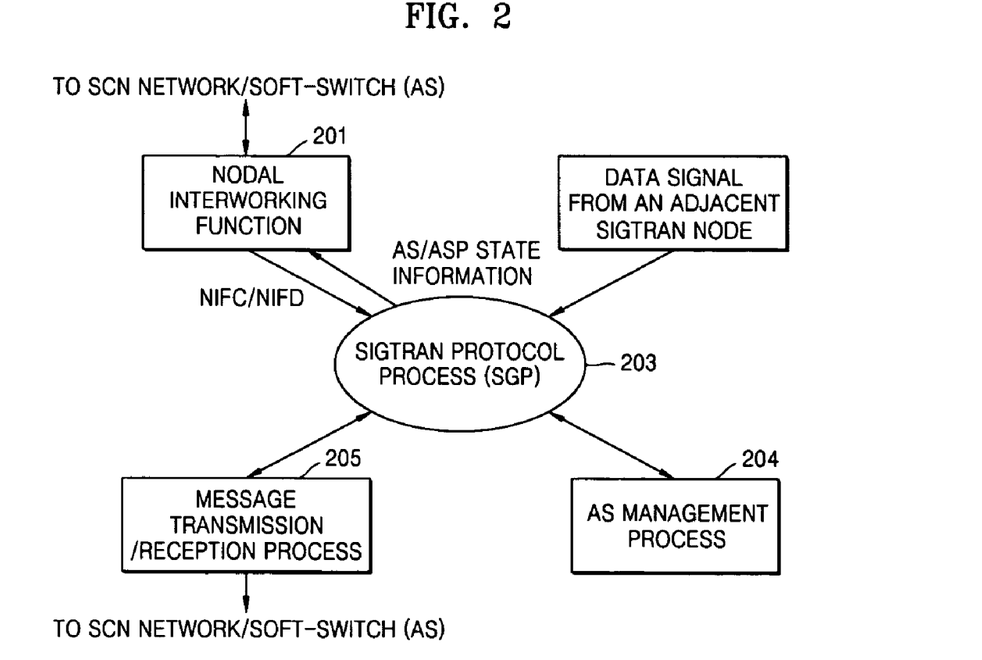
FIG. 2 is a block diagram illustrating a signaling gateway of FIG. 1.

FIG. 2 is a block diagram illustrating the signaling gateway of FIG. 1.

Referring to FIG. 2, a process represents the logic unit of a protocol, and asynchronous communication is performed using a signal between processes. A SIGTRAN protocol process (SGP) 203 manages a unit 201, which is in charge of a nodal interworking function between the AS and the SCN, and functions to monitor signal received from an adjacent SIGTRAN node. If the SGP 203 receives the signal from the nodal interworking function unit 201, it processes the received signal depending on a control signal NIFC or a data signal (NIFD).

First, the SGP 203 initializes a SIGTRAN when the control signal (NIFC) is an initialization process signal, and registers an ASP message in the ASP information storage or the AS information storage of an AS management process 204 depending on a kind of the ASP message when the control signal (NIFC) is the ASP message. If the control signal (NIFC) is a heartbeat request message and ASP state change is notified, AS information is updated at each of the AS information storage and the ASP information storage through the AS management process 204. As described above, the control signal (NIFC) is generated when the SIGTRAN is initialized or when the AS transmits a heartbeat request message/ASP message. This is described in more detail below.

If the SGP 203 receives the data signal (NIFD), which is the SS7 message received from an external SCN 110, through the nodal interworking function unit 201, the SGP 203 searches for an appropriate AS and active ASPs for serving the AS, to distribute the traffic to any one ASP. Here, the data signal NIFD is output through a message transmission/reception process 205 to be transmitted to the adjacent SIGTRAN node through the traffic-distributed ASP. The traffic distribution is described in more detail below.

In the present invention, a description of the data signal received from the adjacent SIGTRAN node is omitted since the data signal is simply transmitted using the SGP 203 to the SCNs 110 and 190 according to a routing key.

That is, the softswitches 130 and 160 include a plurality of ASPs. The softswitches 130 and 160 transmit the data signal (NIFD) to other nodes through a selected ASP among the ASPs, and transmit the heartbeat request message when a CPU utilization ratio and a System Control Transmission Protocol (SCTP) level congestion of the ASPs exceed reference points according to the AS/ASP information. The signaling gateways 120 and 180 update the reference points of the CPU utilization ratio and the SCTP level congestion in response to the heartbeat request message to transmit the heartbeat acknowledgement message to the AS. The signaling gateways 120 and 180 check the CPU utilization ratios and the SCTP level congestions of a plurality of active ASPs within a Circuit Identification Code (CIC) or Sub-System Number (SSN) range according to the AS/ASP information to determine the selected ASP, when the data signal (NIFD) is received from outside and traffic is distributed.

The operation of the system for performing the traffic process in an integrated network of a packet network and a PSTN according to an embodiment of the present invention is described in more detail below.

Figure 3A:
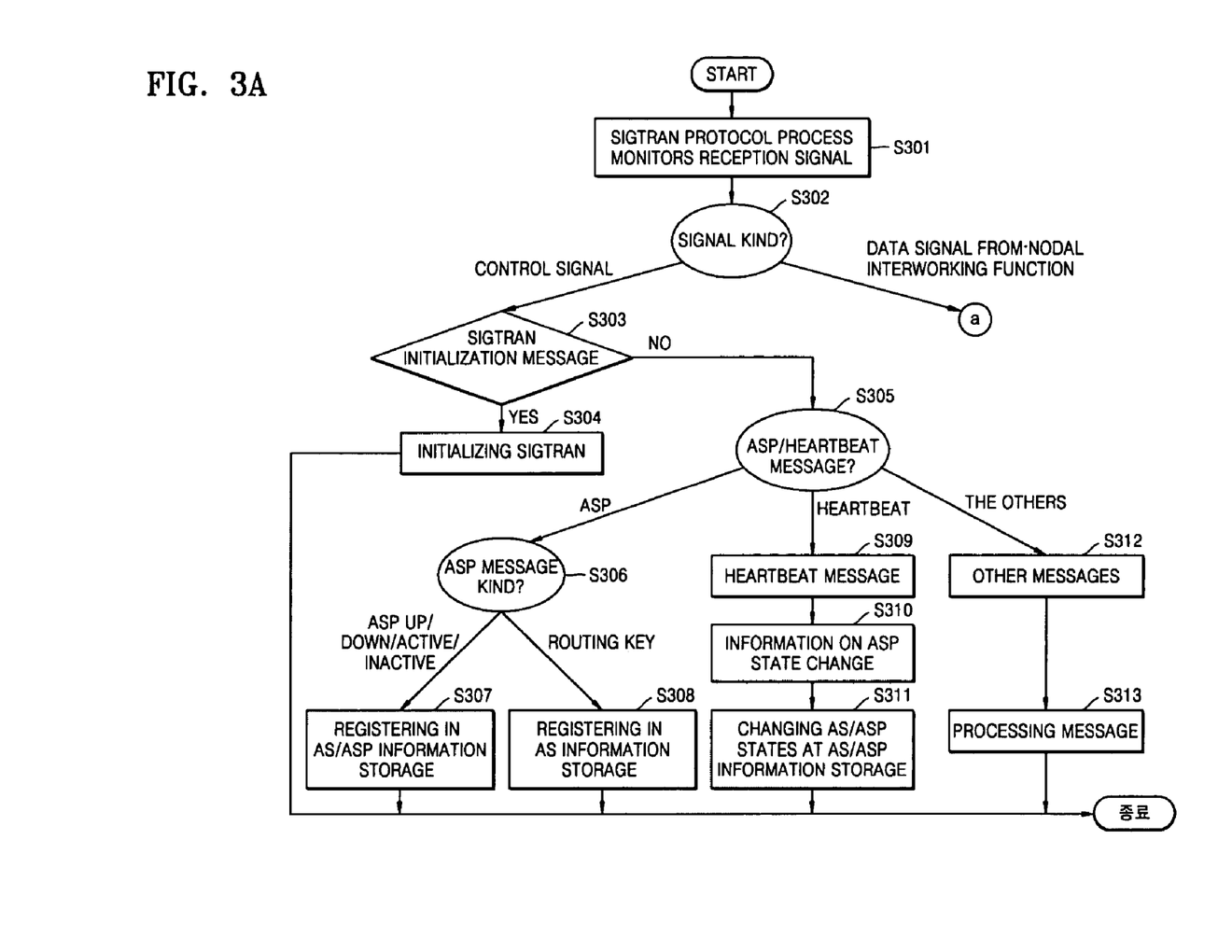
FIGS. 3A and 3B are flowcharts illustrating an operation of a system for performing a traffic process in an integrated network of a packet network and a PSTN according to a preferred embodiment of the present invention.
Figure 3B:
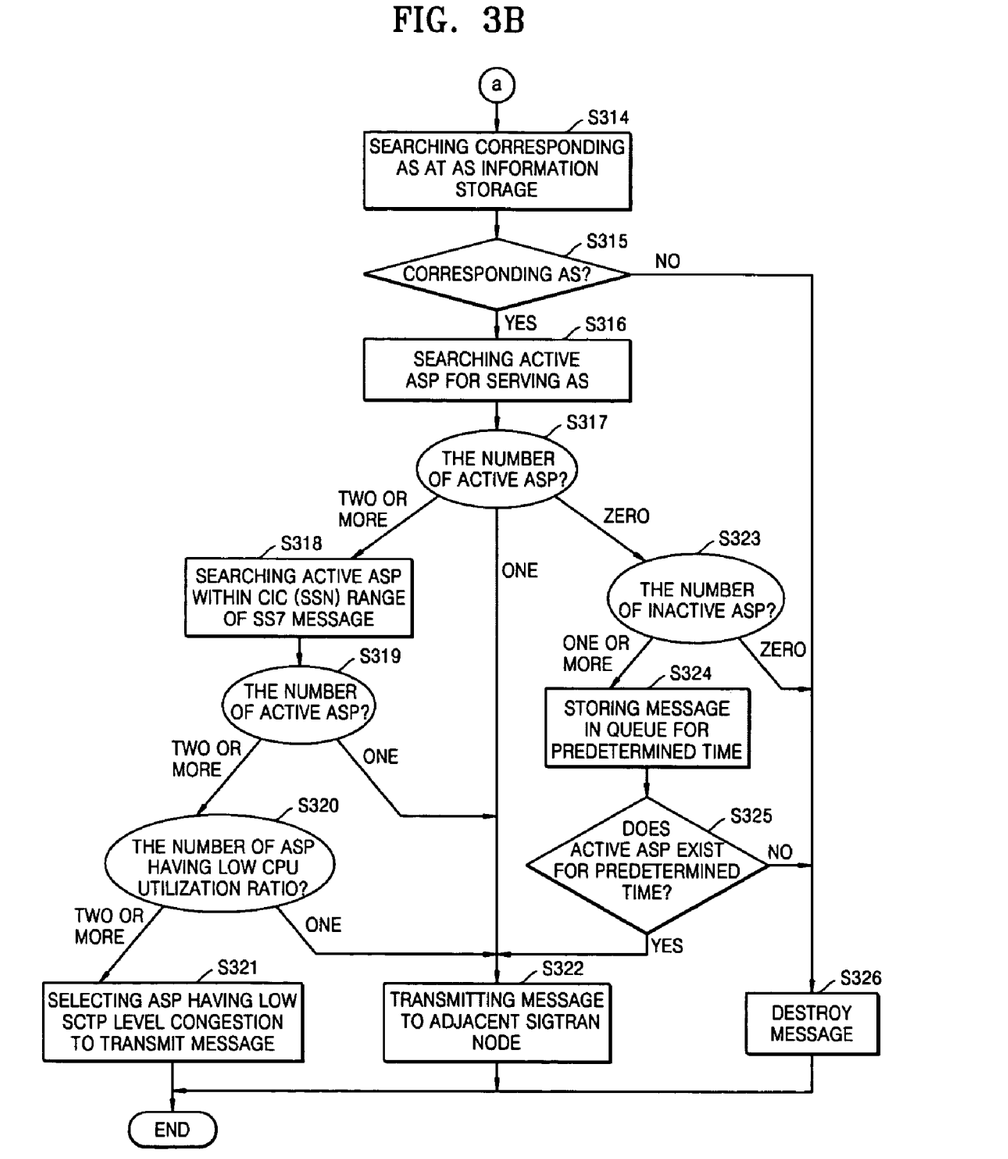

FIGS. 3A and 3B are flowcharts illustrating the operation of the system for performing the traffic process in the integrated network of the packet network and the PSTN according to a preferred embodiment of the present invention.

Figure 4:
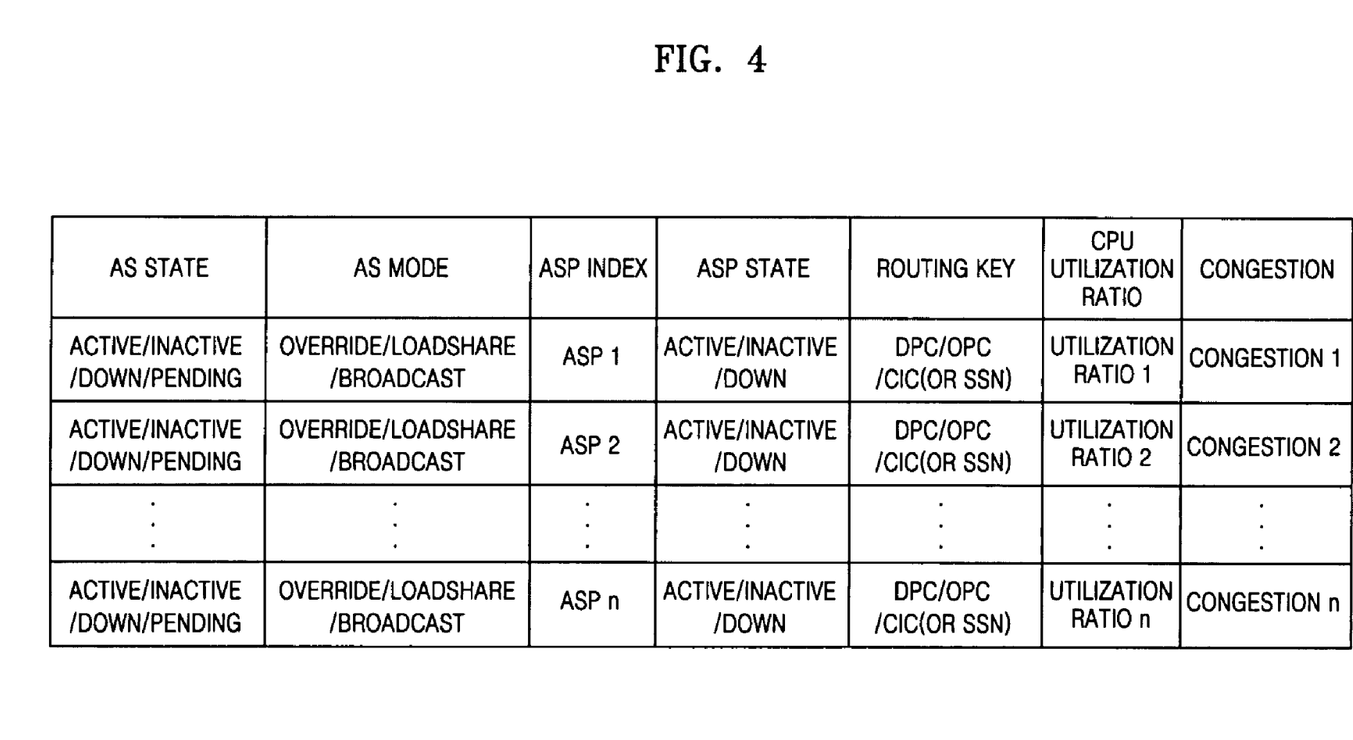
FIG. 4 is a view illustrating an Application Server (AS) information storage according to a preferred embodiment of the present invention.

Referring to FIGS. 3A and 3B, the SGP 203 monitors a reception signal (S301) to perform a process depending on whether the reception signal is the control signal (NIFC) or the data signal (NIFD) received from the nodal interworking function unit 201 (S302). A description of processing the data signal received from the adjacent SIGTRAN node is omitted from the flowcharts. The SGP 203 performs a SIGTRAN initialization process when the received control signal (NIFC) is the SIGTRAN initialization message (S303, S304). When the received control signal (NIFC) is a message relating to the ASP or the heartbeat message, the SGP 203 performs processes according to the respective messages (S305). First, if the control signal (NIFC) is the ASP message, which is an ASP UP/ASP DOWN message or an ASP active/inactive message in kind (S306), information on the message kind is registered in the AS information storage and the ASP information storage (S307). If the ASP message is a routing key in kind, information on the message kind is registered in the AS information storage (S308). Here, as shown in FIG. 4, the routing key includes Destination Point Code (DPC), Originating Point Code (OPC), and Circuit Identification Code (CIC) (or Sub-System Number (SSN)) values. If the received control signal (NIFC) is the heartbeat message and includes information on an ASP state change (S309, S310), the AS and ASP states are changed in the AS information storage and the ASP information storage (S311). If the received control signal (NIFC) is another message, not the SIGTRAN initialization message or the ASP/heartbeat message, the SGP 203 performs a process according to a function of the message (S312, S313).

In the meantime, referring to FIG. 3B, if the reception signal of the SGP 203 is the data signal (NIFD) from the nodal interworking function unit 201, a corresponding AS is searched for in the AS information storage (S314). If the corresponding AS is found (S315), the active ASP for serving the AS is searched for (S316). If the active ASP for serving the AS is two or more in number (S317), the CIC (or SSN) value of the received SS7 message is compared with the CIC (or SSN) value of the active ASP, which is registered in the AS information storage, to search for a corresponding active ASP (S318). If the active ASP is one in number (S319), the message is transmitted to the adjacent SIGTRAN node at which the active ASP is located (S322). If the active ASP is two or more in number (S319), an ASP having a lower CPU utilization ratio than a critical value among the active ASPs is selected (S320). Here, if the ASP having the lower CPU utilization ratio than the critical value is one in number, the message is transmitted to the adjacent SIGTRAN node (S322). If the ASP having the lower CPU utilization ratio than the critical value is two or more in number, an ASP having a lower SCTP level congestion is selected from among the two or more ASPs to transmit the message (S321). If there is an inactive ASP instead of the active ASP for serving the AS, the message is stored in a queue for a recovery time T(r) (S324). If there is no inactive ASP or active ASP, the message is destroyed (S326). If an active ASP is found within the recovery time (S325), the message is transmitted to the adjacent SIGTRAN node (S322). If the recovery time elapses (S325), the message is destroyed (S326). If there is no AS corresponding to the data signal (NIFD) received from the nodal interworking function unit 201, the message is destroyed (S326).

FIG. 4 is a view illustrating the AS information storage according to a preferred embodiment of the present invention.

Referring to FIG. 4, the AS information includes AS state, AS mode, ASP index, ASP state, routing key, CPU utilization ratio, and SCTP level congestion.

The AS state represents a current AS state. In the AS state, there are four states of "AS-Active", "AS-Inactive", "AS-Down", and "AS-Pending". In the AS-Down state, the AS is unavailable and all ASPs for serving the AS are in an ASP-Down state. Initially, the AS is in the AS-Down state. Also, when the AS is eliminated from a configuration, the AS is in the AS-Down state. In the AS-Inactive state, the AS is available, but application traffic is inactive. In the AS-Inactive state, all ASPs relating to the AS are inactive. In the AS-Active state, the AS is available and the application traffic is active. In the AS-Active state, at least one ASP relating to the AS is active. Finally, in the AS-Pending state, the last active ASP of the AS is changed into the ASP-Inactive state or the ASP-Down state. In the AS-Pending state, the "recovery time T(r)" is initiated such that all input signal messages are stored by the SGP 203. If one of the ASPs is activated before termination of "T(r)", the AS is in the AS-Active state and all stored messages are transmitted to the ASP. If the "T(r)" is terminated before the activation of the ASP and the SGP 203 does not have an alternative, the SGP 203 stops the storage of the message and destroys all messages stored previously. Here, if at least one ASP is in the inactive state, the AS is in the AS-Inactive state, and otherwise, the AS is in the AS-Down state.

The AS mode represents the traffic process mode of the AS, and has three modes of "Override", "Loadshare", and "Broadcast." A traffic mode type parameter included in an ASP active message represents that the traffic process mode is used in a specific ASP. If the SGP 203 determines that a mode, which is constructed for a current AS, does not support or is incompatible with the mode of the ASP active message, the SGP 203 responds to the ASP with an error message. If the SGP 203 stores the traffic mode of a firstly activated ASP and receives the message of a traffic mode, which is different from the stored traffic mode, it destroys the received message. When the AS is in the "Override" mode, the SGP 203 transmits all traffic for the AS to the ASP for transmitting the ASP active message. Since an earlier active ASP is regarded as "ASP-inactive", it should no longer receive traffic from the SGP 203. The SGP (or IPSP) 203 transmits a message of "Alternate ASP_Active notify" to the earlier active ASP, and should no longer transmit traffic to the earlier active ASP. The ASP, which receives the message of "Alternate ASP_Active notify", regards its own state as "ASP-Inactive." If the SGP (or IPSP) 203 receives the ASP active message when the AS is in the "Loadshare" mode, traffic is transmitted to all active ASPs as well as to the ASP transmitting the ASP active message. In order to distribute traffic from the SGP 203 to the active ASP provided within the AS, the present invention compares the CIC value of the SS7 message with the CIC value registered in the AS, selects an ASP having a lower CPU utilization ratio within the CIC range if the active ASP is two or more in number, and then compares the SCTP level congestions with one another to transmit the message to the ASP which has the lowest SCTP level congestion, if the selected ASP is plural. When the AS is in the "Broadcast" mode, all currently active ASPs receive the same message.

The ASP index represents ASPs having the routing key registered to serve one AS. When the AS is in the "Loadshare" mode and the active ASP is two or more in number, the routing key value is searched for among the ASPs within the CIC range. When two or more active ASPs are found to have the routing key value, an ASP having a lower CPU utilization ratio is first selected. If more than one ASP is selected, the ASP having the lowest SCTP level congestion is selected to receive traffic from the SGP 203. The ASP can have "Active"/ "Inactive"/"Down" values. These values can change in response to the heartbeat message that is periodically transmitted and received between the SGP 203 and the ASP. The routing key value is determined by the DPC, the OPC, and the CIC (or SSN), and is received from the ASP and stored.

Figure 5:
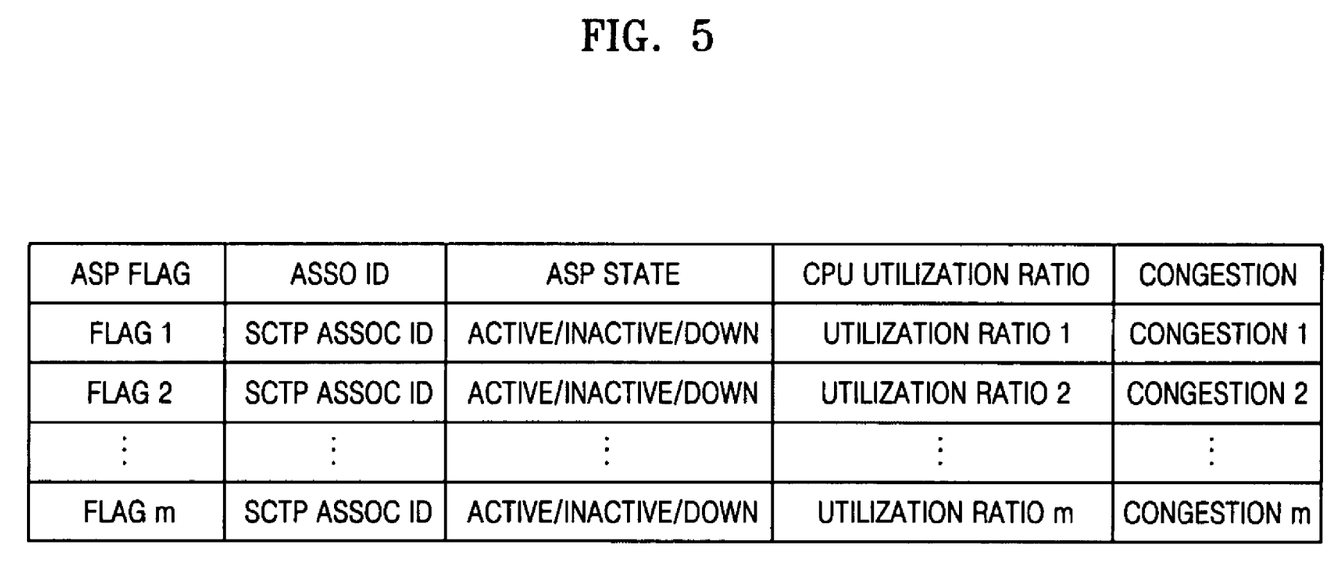
FIG. 5 is a view illustrating an Application Server Process (ASP) information storage according to a preferred embodiment of the present invention.

FIG. 5 is a view illustrating the ASP information storage according to a preferred embodiment of the present invention.

Referring to FIG. 5, the ASP information includes ASP flag, association IDentification (ID), ASP state, CPU utilization ratio, and SCTP level congestion. The ASP flag is a value for representing whether or not a certain value is stored in the ASP information storage, and the association ID is a value for identifying "association" of a SIGTRAN SCTP. The ASP state is a value for representing the state of the ASP, which can have "Active"/"Inactive"/"Down" values. The CPU utilization ratio and the SCTP level congestion of the ASP are values for selecting the most appropriate ASP when in the "Loadshare" mode.

Figure 6:
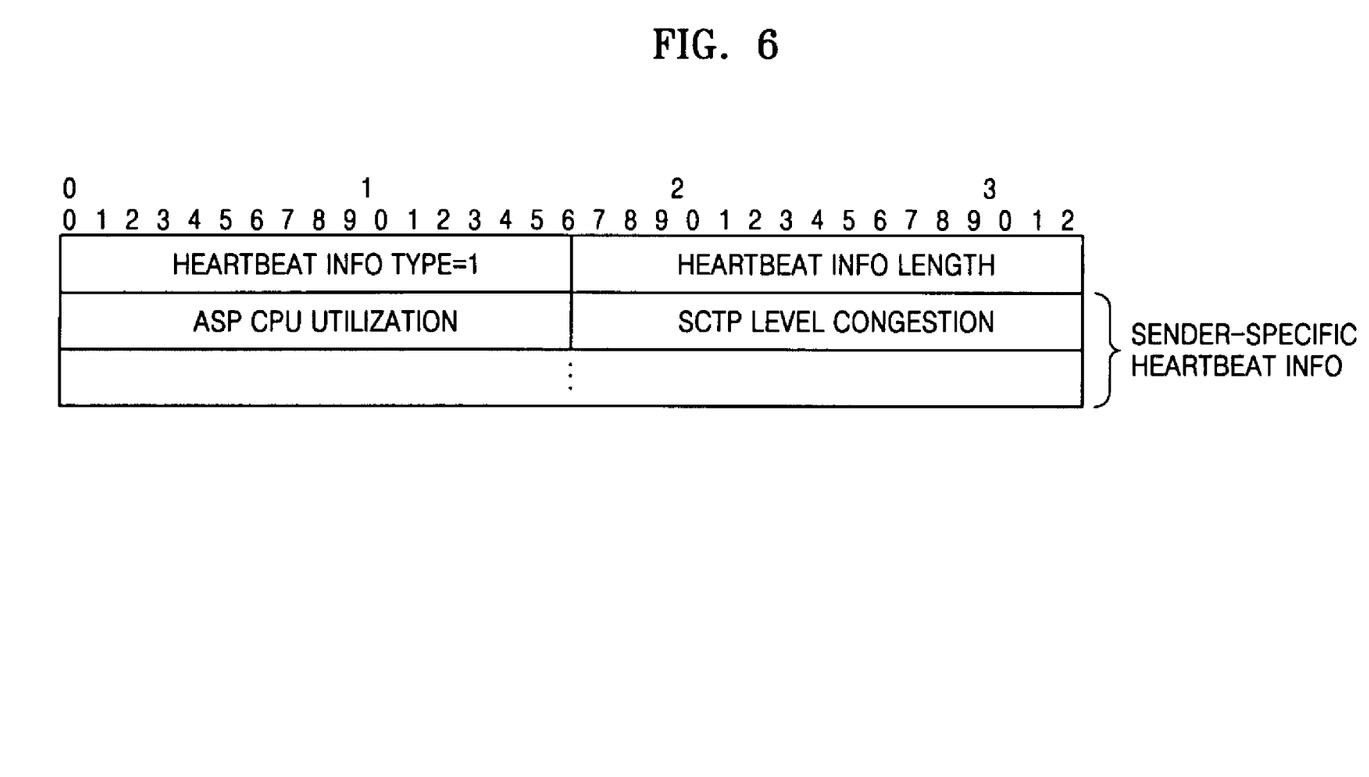
FIG. 6 is a view illustrating a heartbeat request message according to a preferred embodiment of the present invention.

FIG. 6 is a view illustrating the heartbeat request message according to a preferred embodiment of the present invention.

Referring to FIG. 6, the heartbeat request message includes heartbeat information Type, Length, Value (TLV), that is, a heartbeat information type, a heartbeat information length, and sender-specific heartbeat information. The sender-specific heartbeat information includes the CPU utilization ratio and the SCTP level congestion of the ASP. The SGP 203 uses the CPU utilization ratio of the ASP as a first reference for searching for an appropriate ASP that would transmit the SS7 message. When two or more ASPs satisfy the first reference, the SGP 203 uses the SCTP level congestion as a second reference.

Figure 7:
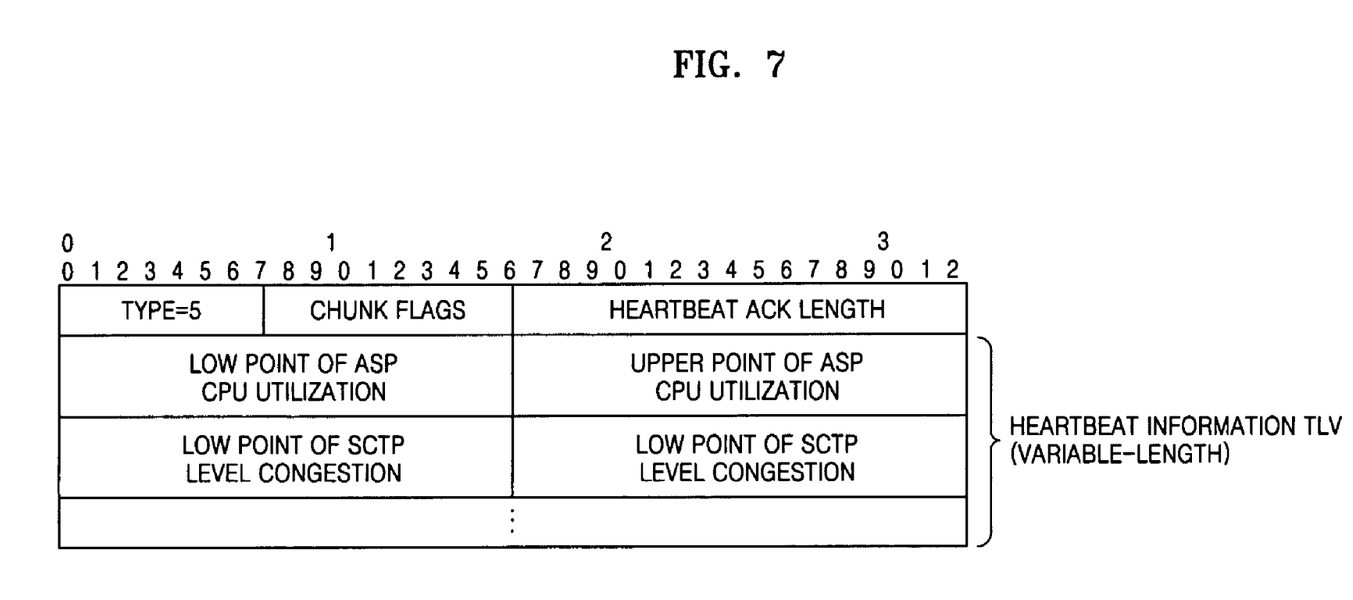
FIG. 7 is a view illustrating a heartbeat acknowledgement message according to a preferred embodiment of the present invention.

FIG. 7 is a view illustrating the heartbeat acknowledgement message according to a preferred embodiment of the present invention.

Referring to FIG. 7, the heartbeat acknowledgement message includes type, chunk flags, heartbeat acknowledgement length, and heartbeat information TLV.

The heartbeat information TLV includes the low point and the high point of the CPU utilization ratio of the ASP, and the low point and the high point of the SCTP level congestion of the ASP. The SGP 203 notifies the AS of the reference point of the CPU utilization ratio and the reference point of the SCTP level congestion in response to the heartbeat request message of the ASP such that when the ASP exceeds the reference points, the AS can again transmit the heartbeat message to the SGP 203. Here, the reference point of the CPU utilization ratio is classified into a high reference point and a low reference point. The high reference point of the CPU utilization ratio is the CPU utilization ratio of an ASP having a higher CPU utilization ratio than a corresponding ASP, and the low reference point of the CPU utilization ratio is the CPU utilization ratio of an ASP having a lower CPU utilization ratio than the corresponding ASP. The reference point of the SCTP level congestion is classified into a high reference point and a low reference point. The high reference point of the SCTP level congestion is the SCTP level congestion of an ASP having a higher SCTP level congestion than a corresponding ASP, and the low reference point of the SCTP level congestion is the SCTP level congestion of an ASP having a lower SCTP level congestion than the corresponding ASP.

As described above, according to the system for performing a traffic process in an integrated network of a packet network and a PSTN, when the SGP 203 searches for one AS that is in the traffic mode of "Loadshare" and distributes traffic so as to receive the SS7 message from the SCN and transmit the received SS7 message through the signaling gateway, traffic is distributed to the active ASP having the lowest CPU utilization ratio in the AS information storage, when there are a plurality of active ASPs for serving the one AS within the CIC (or SSN) range. And, traffic is distributed to the active ASP having the lowest SCTP level congestion in case where there is more than one active ASP having the lowest CPU utilization ratio. The CPU utilization ratio is classified into two reference points. The high reference point is the CPU utilization ratio of an ASP having a higher CPU utilization ratio than one ASP, and the low reference point is the CPU utilization ratio of an ASP having a lower CPU utilization ratio than the one ASP. The same rule is also applied to the SCTP level congestion. Whenever the reference point is exceeded, the ASP notifies the SGP 203 by using the heartbeat message. Accordingly, the SGP 203 stores the ASP information on the exceeding of the reference point to monitor admissibility and maintain the newest ASP information having the lowest CPU utilization ratio and the SCTP level congestion. After the SGP 203 receives the heartbeat message from the ASP, it notifies the ASP of the reference points of the CPU utilization ratio and the SCTP level congestion. Further, the SGP 203 changes the sate of an ASP that does not receive the heartbeat message to the inactive state such that the inactive ASP is not selected next time, and such that when the inactive ASP is changed to an active state, it can be selected again starting from a next message.

The present invention can also be embodied as computer readable codes on a computer-readable recording medium. The computer-readable recording medium is any data storage device that can store data which can thereafter be read by a computer system. Examples of the computer-readable recording medium include read-only memory (ROM), random-access memory (RAM), CD-ROMs, magnetic tapes, floppy disks, and optical data storage devices, The computer-readable recording medium can also be distributed over a network of coupled computer systems so that the computer readable code is stored and executed in a decentralized fashion.

The inventive system for performing the traffic process in an integrated network of a packet network and a PSTN provides AS traffic multiplexing such that when the traffic mode of the ASP is "Loadshare" in the SIGTRAN of the signaling gateway, the traffic process for the SS7 message can be effectively and rapidly performed by using the CPU utilization ratio, the admissibility, and the SCTP level congestion of the ASP, and the admissibility can be enhanced by coping with ASP state change. Further, the present invention enables a voice service to be provided at a low price in a Voice over ATM (VoATM) or Voice over IP (VoIP) system where the SCN and the packet network are associated with each other.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system for performing a traffic process in an integrated network of a VoIP (Voice over Internet Protocol) network and a PSTN (Public Switched Telephone Network), the system comprising:
    a softswitch which has a plurality of ASPs (Application Server Processes), transmits a data signal to other nodes through a selected ASP that is selected from among the plurality of ASPs, and transmits a heartbeat request message when a CPU (Central Processing Unit) utilization ratio and an SCTP (System Control Transmission Protocol) level congestion of one of the ASPs exceed respective reference points according to stored AS (Application Server)/ASP information; and
    a signaling gateway which updates the reference points of the CPU utilization ratio and the SCTP level congestion that are stored in the AS/ASP information in response to the heartbeat request message, transmits a heartbeat acknowledgement message that includes the updated reference points to the softswitch, and checks the CPU utilization ratio and the SCTP level congestion for a plurality of active ASPs within a predetermined CIC (Circuit Identification Code) or SSN (Sub-System Number) range according to the AS/ASP information, to determine the selected ASP when the signaling gateway receives data signal from outside and traffic is distributed,
    wherein the signaling gateway stores the data signal in a queue for a recovery time when no active ASP is found, the data signal is transmitted to an adjacent node if an active ASP is found within the recovery time, and is destroyed if no active ASP is found within the recovery time, and
    wherein the signaling gateway distributes the traffic to an active ASP having a lower CPU utilization ratio than a critical value among a plurality of active ASPs, when there are the plurality of active ASPs among the ASPs, and then, again distributes the traffic to an active ASP having the lowest SCTP level congestion when there is more than one active ASP having the lower CPU utilization ratio than the critical value.

2. The system of claim 1, wherein the signaling gateway changes an ASP not receiving the heartbeat request message to an inactive state such that the inactive ASP is not selected next time, and such that when the inactive ASP is changed back to an active state, the active ASP can be selected starting from the next data signal.

3. The system of claim 1, wherein the reference point of the CPU utilization ratio is classified into a high reference point and a low reference point, the high reference point of the CPU utilization ratio is a CPU utilization ratio of an ASP having a higher CPU utilization ratio than a corresponding ASP, and the low reference point of the CPU utilization ratio is a CPU utilization ratio of an ASP having a lower CPU utilization ratio than the corresponding ASP.

4. The system of claim 1, wherein the reference point of the SCTP level congestion is classified into a high reference point and a low reference point, the high reference point of the SCTP level congestion is an SCTP level congestion of an ASP having a higher SCTP level congestion than a corresponding ASP, and the low reference point of the SCTP level congestion is an SCTP level congestion of an ASP having a lower SCTP level congestion than the corresponding ASP.

5. The system of claim 1, wherein the signaling gateway comprises an AS management process for storing the AS/ASP information.

6. The system of claim 5, wherein the AS information comprises AS state, AS mode, ASP index, ASP state, routing key, CPU utilization ratio, and SCTP level congestion.

7. The system of claim 5, wherein the ASP information comprises ASP flag, association IDentification (ID), ASP state, CPU utilization ratio, and SCTP level congestion.

8. The system of claim 1, wherein the heartbeat request message is comprised of heartbeat information TLV (Type, Length, Value), and has the CPU utilization ratio and the SCTP level congestion.

9. The system of claim 1, wherein the heartbeat acknowledgement message is comprised of type, chunk flags, heartbeat acknowledgement length and heartbeat information TLV, and comprises the low point of CPU utilization ratio, the high point of CPU utilization ratio, the low point of SCTP level congestion and the high point of SCTP level congestion.

10. A method of performing a traffic process in an integrated network of a VoIP (Voice over Internet Protocol) network and a PSTN (Public Switched Telephone Network), the method comprising:

receiving a data signal from outside;

checking a CPU utilization ratio and an SCTP level congestion of a plurality of active ASPs in a softswitch that are within a predetermined CIC or SSN range according to stored AS/ASP information, to select one of the active ASPs;

distributing traffic to the selected ASP; and transmitting the data signal to other nodes through the selected ASP, wherein checking a CPU utilization ratio and an SCTP level congestion further comprises:

receiving a heartbeat request message from the softswitch when the CPU utilization ratio and the SCTP level congestion of one of the ASPs exceed respective reference points according to the AS/ASP information; updating the reference points of the CPU utilization ratio and the SCTP level congestion that are stored in the AS/ASP information in response to the heartbeat request message and transmitting a heartbeat acknowledgement message that includes the updated reference points to the softswitch;

storing the data signal in a queue for a recovery time when no active ASP is found, the data signal being transmitted to an adjacent node if an active ASP is found within the recovery time, and being destroyed if no active ASP is found within the recovery time; and wherein in the distributing of traffic, the traffic is distributed to an active ASP having a lower CPU utilization ratio than a critical value among a plurality of active ASPs, when there are the plurality of active ASPs among the ASPs, and then, the traffic is again distributed to an active ASP having the lowest SCTP level congestion when there are more than one active ASP having the lower CPU utilization ratio than the critical value 0.

11. The method of claim 10, wherein in the distributing of traffic, an ASP that does not receive the heartbeat request message is changed to an inactive state such that the inactive ASP is not selected next time, and such that when the inactive ASP is changed back to an active state, the active ASP can be selected starting from a next data signal.

12. The method of claim 10, wherein the reference point of the CPU utilization ratio is classified into a high reference point and a low reference point, the high reference point of the CPU utilization ratio is a CPU utilization ratio of an ASP having a higher CPU utilization ratio than a corresponding ASP, and the low reference point of the CPU utilization ratio is a CPU utilization ratio of an ASP having a lower CPU utilization ratio than the corresponding ASP.

13. The method of claim 10, wherein the reference point of the SCTP level congestion is classified into a high reference point and a low reference point, the high reference point of the SCTP level congestion is an SCTP level congestion of an ASP having a higher SCTP level congestion than a corresponding ASP, and the low reference point of the SCTP level congestion is an SCTP level congestion of an ASP having a lower SCTP level congestion than the corresponding ASP.

14. The method of claim 10, wherein the AS information comprises AS state, AS mode, ASP index, ASP state, routing key, CPU utilization ratio, and SCTP level congestion.

15. The method of claim 10, wherein the ASP information comprises ASP flag, association IDentification (ID), ASP state, CPU utilization ratio, and SCTP level congestion.

16. The method of claim 10, wherein the heartbeat request message is comprised of heartbeat information TLV (Type, Length, Value), and comprises CPU utilization ratio and SCTP level congestion.

17. The method of claim 10, wherein the heartbeat acknowledgement message is comprised of type, chunk flags, heartbeat acknowledgement length and heartbeat information TLV, and comprises the low point of CPU utilization ratio, the high point of CPU utilization ratio, the low point of SCTP level congestion and the high point of SCTP level congestion.

* * * * *